No. 707,966. Patented Aug. 26, 1902.
G. GORDON.
RAIL JOINT.
(Application filed Apr. 30, 1902.)
(No Model.) 2 Sheets—Sheet 1.
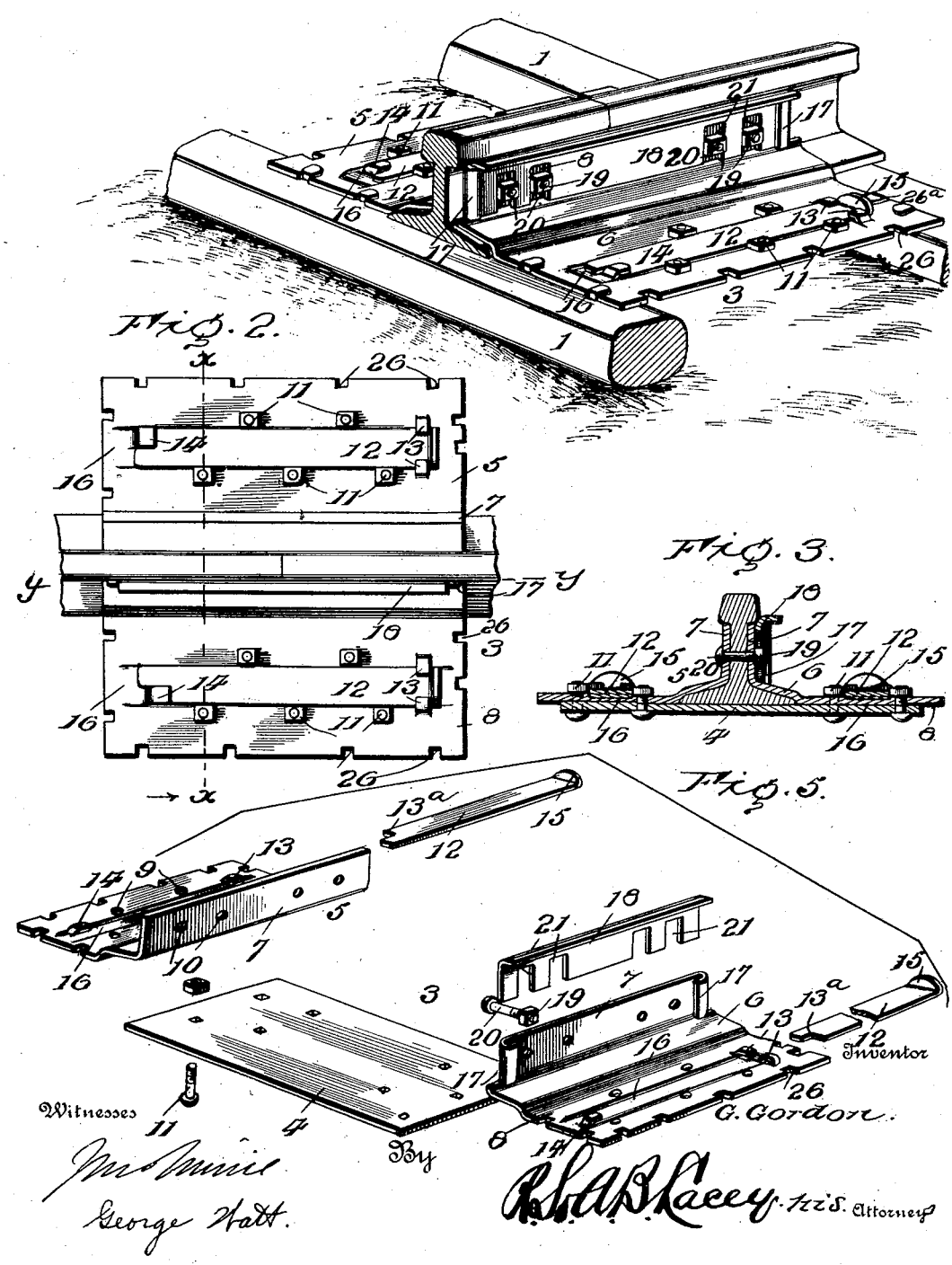

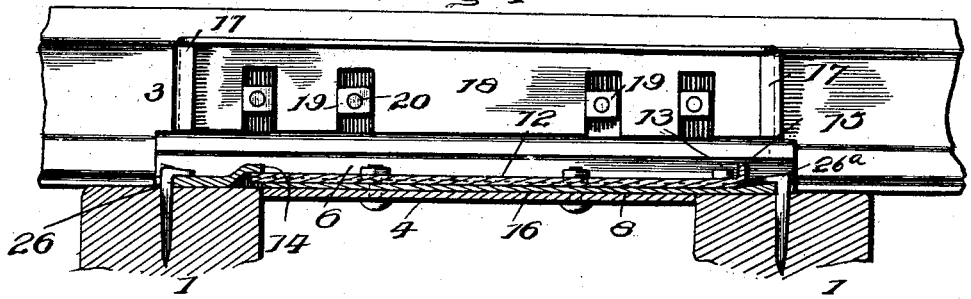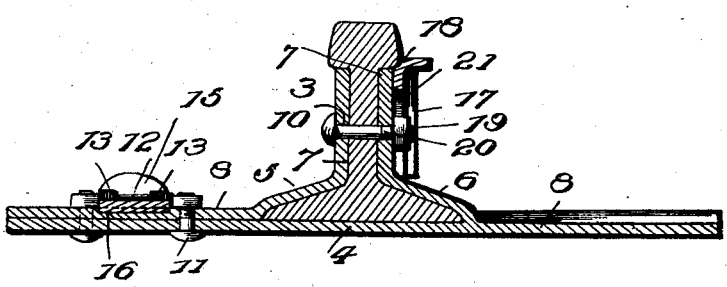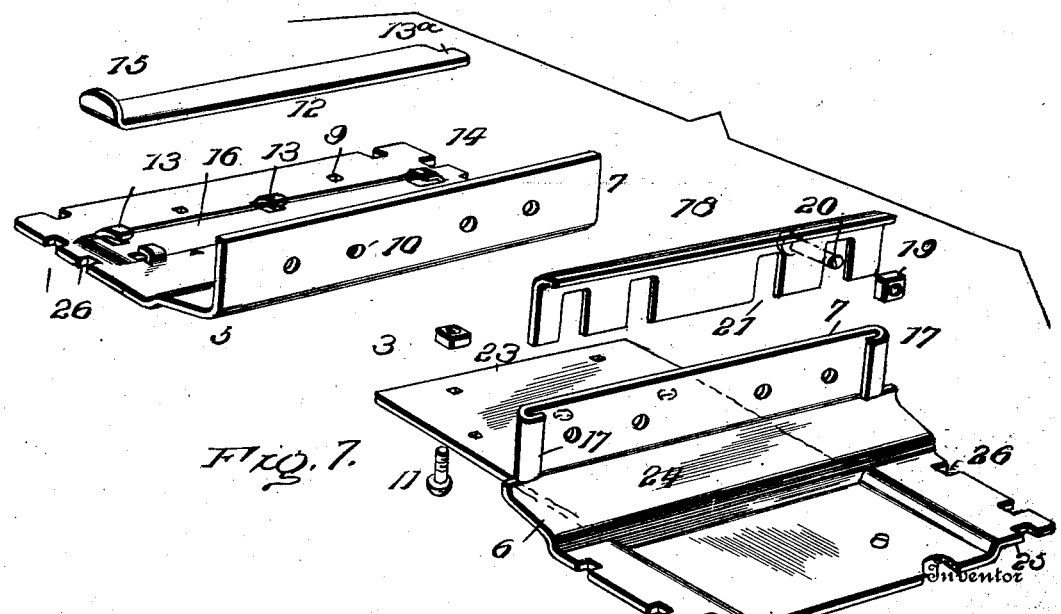

UNITED STATES PATENT OFFICE.

GEORGE GORDON, OF LUTHER, MICHIGAN, ASSIGNOR OF ONE-FOURTH TO THOMAS P. MAGRANE, OF CHICAGO, ILLINOIS.

RAIL-JOINT.

SPECIFICATION forming part of Letters Patent No. 707,966, dated August 26, 1902.

Application filed April 30, 1902. Serial No. 105,353. (No model.)

*To all whom it may concern:*

Be it known that I, GEORGE GORDON, a citizen of the United States, residing at Luther, in the county of Lake and State of Michigan, have invented certain new and useful Improvements in Rail-Joints; and I do hereby declare the following to be a full, clear, and exact description of the invention, such as will enable others skilled in the art to which it appertains to make and use the same.

This invention relates to improvements in rail-joints, and has for its primary object means for supporting and securing the ends of the rails in such manner as will effectually prevent the ends from being displaced one from the other.

A further object of the invention is to provide means for securely fastening the ends of rails in a manner that will make the joints as durable as the body thereof, in combination with means for locking the nuts in such manner as will prevent their being released by the jolting of the cars.

This invention also comprehends improvements in rail-joints of the type where a plate is interposed between the ties and the ends of the rails are squarely seated thereon and the joints being bolted to the rails, the said bed-plate, and the cross-ties.

Many other advantages and objects will be hereinafter referred to, and be particularly pointed out in the claims.

In the drawings forming a part of this specification, Figure 1 is a perspective view of my improved rail-joint, showing its application. Fig. 2 is a top plan view of the same. Fig. 3 is a cross-section on the line X X of Fig. 2. Fig. 4 is a vertical section on the line Y Y of Fig. 2. Fig. 5 is a perspective view of the parts separated. Fig. 6 is a cross-sectional view illustrating a modification of my invention. Fig. 7 is a perspective view of the same, showing the parts separated.

The numeral 1 indicates the usual cross-ties, between two of which are secured by bolts or otherwise my improved rail-joint 3. The rail-joint comprises a bed-plate 4, two side plates 5 and 6, each of which is composed of a vertical member 7, and base 8, the latter conforming to the configuration of the rails to make a tight and at the same time neat fit.

The side plate 5 is provided with a series of openings 9 and 10 and is securely bolted to the bed-plate 4, bolts 11 passing through openings in the bed-plate 4 and the openings 9 in the plate 8 to fasten the two parts together, the nuts being secured on the upper ends of the bolts that they may be readily locked against rotation by my improved locking device 12. The lock 12 consists of a slide working in guides 13 and is reduced at 13ª, said end 13ª resting in a spring-pressed seat 14 at the opposite end, and it is further provided with a projection 15, whereby it may be readily withdrawn when so desired, and to further insure the locking of the nuts the slide works in a depression 16. It will therefore be obvious that when the nuts are supplied, as clearly disclosed in the drawings, along each side of the slide when the latter is positioned the nuts are effectually locked against rotation by the jolting of the cars or any other means, and to release the same it would be necessary to withdraw the slide. To further insure the holding of the lock 12 one of the spikes, as at 26ª, employed to fasten the bed-plate to the ties, is located in front of the projection 15. The other side plate 6 is identical with its companion member 5 in all respects except that the vertical member 7 is provided with flanges 17 at its ends to receive a device 18 to lock the nuts 19 of the bolts 20, which secure the side plates and rails together. This locking device is adapted to slide in the ways 17 and is provided with notches 21, corresponding in number to the nuts 10, so that when the latter is adjusted the device 18 is forced down into the ways and absolutely prevents the rotation of said nuts.

In the modification illustrated in Figs. 6 and 7 the bed-plate 23 and side plate 6 are made in one instead of two pieces as disclosed in the preferred form. This construction enables me to dispense with an individual locking device for the bolts used to lock the bed-plate and side plate together, and at the same time it affords a structure of such a character that an ordinary fish-plate may be used in combination therewith; but to allow the ends of the rails to rest squarely on the bed-plate 23 and the cross-ties the ends of the side plate 24, which rest in the ties, are provided with seats 25, hence making a smooth and uninterrupted surface between the ties and bed-plate, which prevents displacement of the ends of the rail.

The parts thus arranged, the operation is substantially as follows: The side plates 5 and 6 having been bolted to the bed-plate and the nuts locked in position by the locking-slide, the ends of the rails are passed between the vertical members 7 and bolted by the bolts 20, and the locking device 18 is accordingly adjusted. The side plates are now spiked to the ties in the usual manner, the spikes engaging notches 26, thereby gripping and holding the rail in such manner that side play or loosening of the parts is prevented. It will therefore be seen that with a joint constructed and arranged as herein set forth I provide a means for holding the ends of the rail uniformly and in such manner that under no circumstances can one end be depressed more than the other, and by reason of the bed-plate fitting to a nicety the space intermediate the ties 1 the upper surface thereof is on a plane with the upper surface of said ties.

In rail-joints now in use considerable difficulty has been experienced in the dropping of one rail by the wearing of the openings through which the bolts pass, causing a pounding and disagreeable noise, and in time necessitates not only the replacing of the plates, but not infrequently the rail; but this objectionable feature I have successfully overcome.

The invention possesses many decided advantages over the prior state of the art, and it is thought that the construction and merits of the same will be readily appreciated by those skilled in the art to which it appertains.

Having thus described the invention, what is claimed as new is—

1. In a rail-joint, the combination with a pair of cross-ties, of side plates secured to said ties, a bed-plate intermediate the ties, seats formed on the bed-plate to rest on the ties, adjoining rails resting on the ties and the bed-plate, and bolts securing the rails and the side plates together, substantially as described.

2. In a rail-joint, the combination with a pair of side plates, each plate having a depression, ways and a spring-seat, a bed-plate, bolts securing the side plates and the bed-plate together, a device for locking the nuts of the bolts against rotation, said device comprising a slide seated in the depression, guided therein by ways and held by the spring-seat, substantially as described.

3. In a rail-joint, the combination with a pair of side plates, each plate having ways and a spring-seat, a bed-plate, nutted bolts securing the side plates and the bed-plate together, a device for locking the nuts of the bolt against rotation, said device comprising a slide guided by the ways and held by the spring-seat, substantially as described.

In testimony whereof I affix my signature in presence of two witnesses.

GEORGE GORDON. [L. S.]

Witnesses:
CLARA NICHOSON,
EARL FAIRBANKS.